United States Patent [19]

Reese et al.

[11] Patent Number: 5,080,045
[45] Date of Patent: Jan. 14, 1992

[54] JOGGER'S PET LEASH

[76] Inventors: Sharon C. Reese, 11599 West Fair Ave., Littleton, Colo. 80127; Walter D. Komhyr, 200 South 68th St., Boulder, Colo. 80303

[21] Appl. No.: 716,502

[22] Filed: Jun. 17, 1991

[51] Int. Cl.⁵ ............................................. A01K 1/00
[52] U.S. Cl. ................................................. 119/109
[58] Field of Search ................. 119/96, 106, 109, 29, 119/120; 272/109

[56] References Cited

U.S. PATENT DOCUMENTS

| | | | |
|---|---|---|---|
| 2,275,983 | 3/1942 | Nadeau. | |
| 2,437,585 | 3/1948 | Zimmern | 227/49 |
| 3,004,519 | 10/1961 | Weissman | 119/96 |
| 3,295,501 | 1/1967 | Riley | 119/96 |
| 3,721,216 | 3/1973 | Lippe et al. | 119/106 |
| 4,667,624 | 5/1987 | Smith | 119/96 |
| 4,862,833 | 9/1989 | Brotz | 119/120 |
| 4,932,362 | 6/1990 | Birchmire et al. | 119/96 |

FOREIGN PATENT DOCUMENTS

| | | | |
|---|---|---|---|
| 322015 | 6/1989 | European Pat. Off. | 119/96 |
| 35387 | 4/1886 | Fed. Rep. of Germany. | |

Primary Examiner—Gene Mancene
Assistant Examiner—Thomas Price
Attorney, Agent, or Firm—John E. Reilly

[57] ABSTRACT

A leash device has been devised for use by a person in walking or jogging while leaving both hands free and is made up of a belt encircling the jogger's waist, a suspension ring in outer spaced surrounding relation to the belt and flexibly suspended downwardly and away from the belt so as to loosely encircle the hip region, and a leash extends from the ring for attachment to a dog and has an end connector which is slidable around the full circumferential extent of the ring while being free to rotate about its own axis to avoid twisting or snarling of the leash.

21 Claims, 2 Drawing Sheets

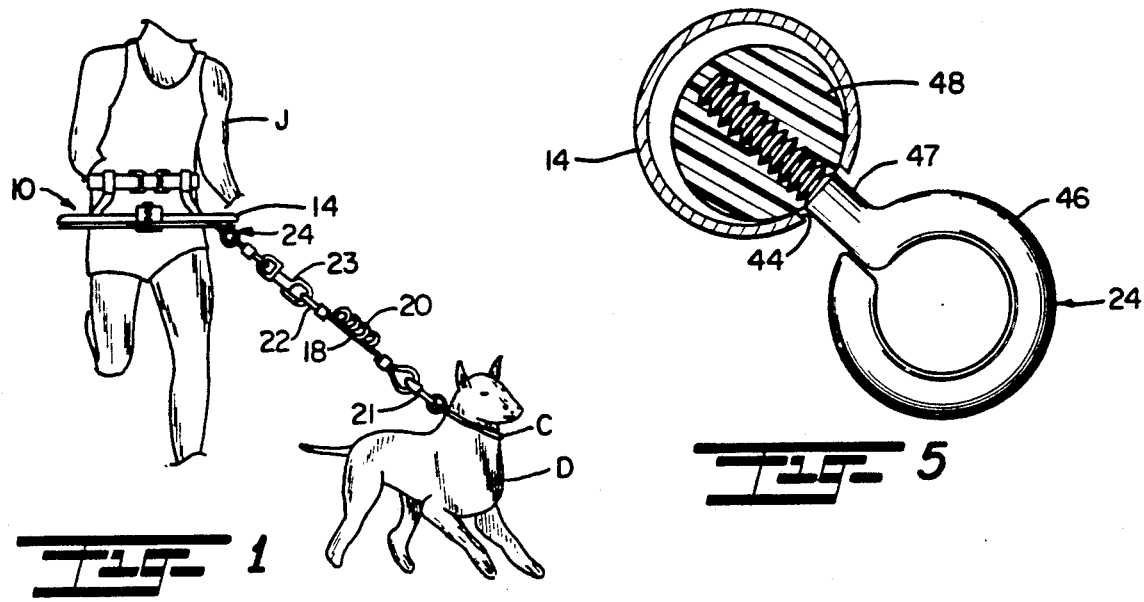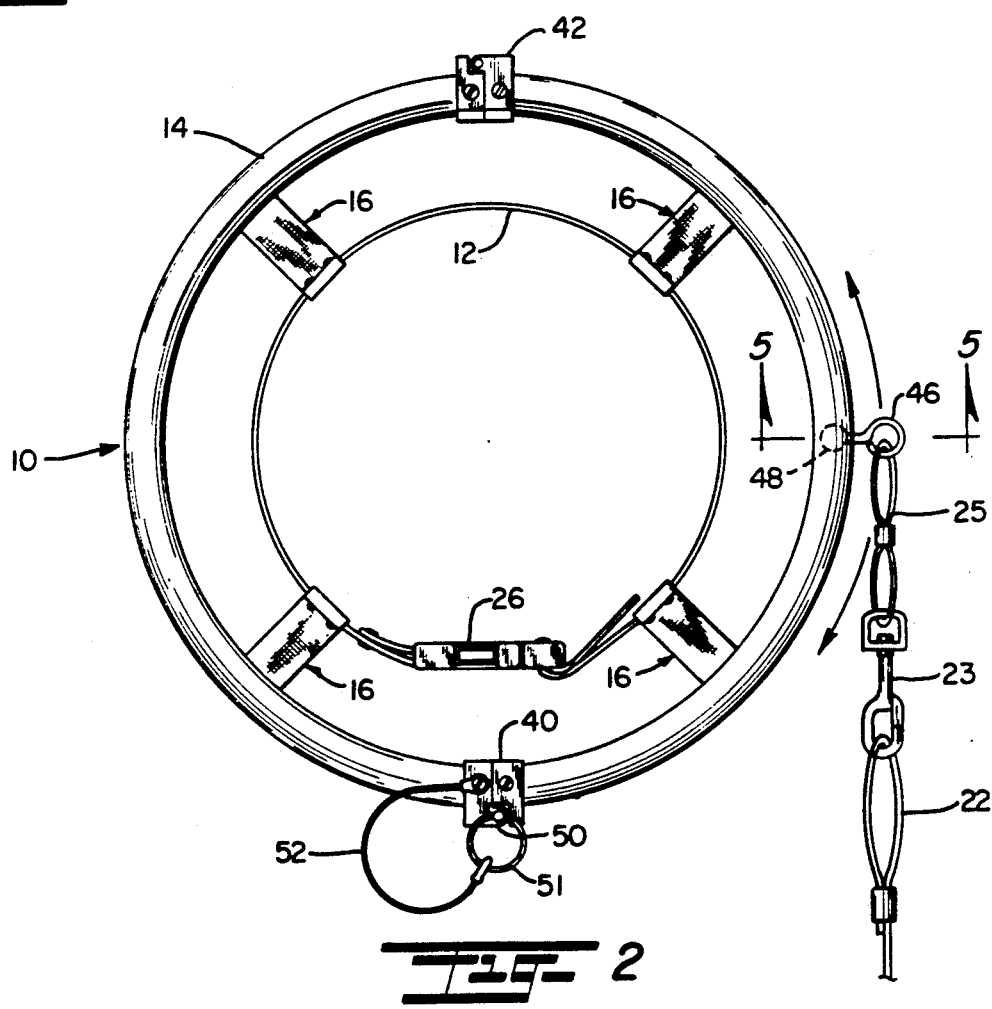

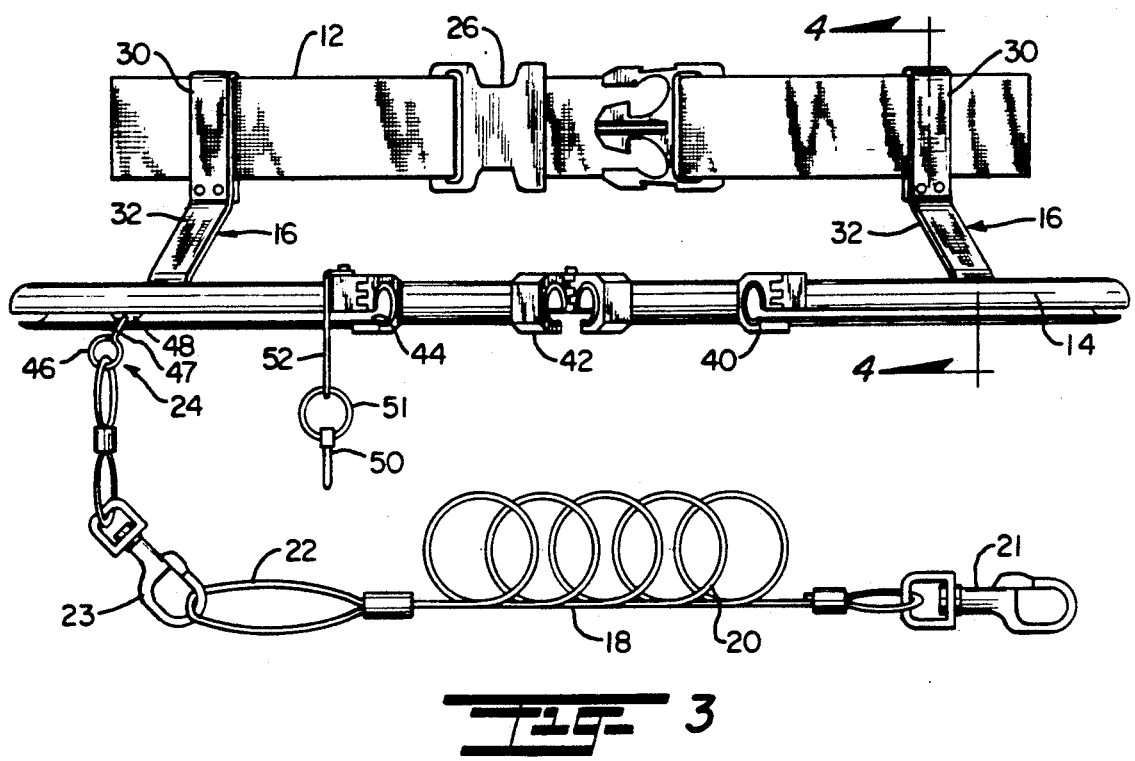
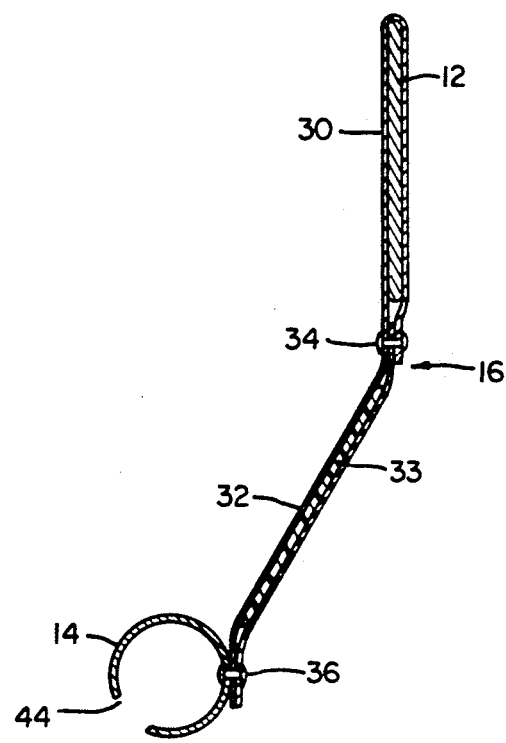

JOGGER'S PET LEASH

SPECIFICATION

This invention relates to a pet leash; and more particularly relates to a novel and improved dog leash apparatus for exercising both the dog and its master during walking or jogging. The present invention may be best typified by describing its use in exercising a dog, although it will become readily apparent that it may be equally useful in exercising other animals or children.

BACKGROUND AND FIELD OF THE INVENTION

In exercising a dog on a leash, the exerciser's body can be subjected to unexpected stresses and strains. Normal movements are distorted since the wanderings of the dog can cause the owner to switch the lease from hand-to-hand or to pass the leash behind one's back. However, ordinances have been passed in most cities of any size to require that the dog be kept on a leash and which poses a very real problem when one is attempting to walk or jog without becoming tangled in the leash.

To our knowledge, no one has successfully devised a leash apparatus which will allow the hands to be free and permit the dog to move freely around its owner. Freed from the strain of holding onto the leash and from the irritation of hand-switching to avoid becoming tangled in the leash, the walking and jogging activities for the dog's owner become more natural. Walking and jogging, while exercising a dog, promotes cardiovascular endurance and increases lower body strength. Furthermore, weights can be carried in the hands to increase upper body strength.

U.S. Pat. No. 3,004,519 to N. Weissman discloses a child's safety harness having a waist belt with a circumferential slot; and when the child is tethered to a stationary object, a ball bearing device on the end of the tether can be inserted into the slot so that the child can turn or rotate without becoming entangled in the tether itself. U.S. Pat. No. 4,862,833 to G. R. Brotz discloses an animal tether which includes a channel-shaped holder or track for ball bearings at the end of a leash. U.S. Pat. No. 4,667,624 to D. Smith discloses another type of waist belt for attaching a leash to a child's harness. The German Patent No. 35,386 to T. Matt discloses a slotted tube for the purpose of retaining a ball at one end of a chain or leash and the chain is provided with a coiled spring so as to minimize any stress on the body.

Harnesses of the type devised are unsatisfactory for use in exercising a dog and particularly if the harness is to be worn by a person. It is important that the pull of the dog's leash be located somewhat below the person's waist to minimize any tendency to unbalance the user. At the same time, it is desirable that the leash be flexibly attached with respect to the user and also be free to advance or slide with respect to the point of suspension from the user so as to avoid tangling or possible tripping of the user. Further, it is desirable that the apparatus be easy to attach to or detach from the waist of the user.

SUMMARY OF THE INVENTION

Accordingly, it is an object of the present invention to provide for a novel and improved leash device and which is particularly adaptable for use in walking or jogging with a dog.

It is another object of the present invention to provide for a novel and improved leash apparatus which is easily attachable to and detachable from a person's waist, leaving the hands free during walking or jogging and avoid becoming tangled in the leash as well as to avoid undue jarring or strains passed on to the person in exercising one's dog.

A further object of the present invention is to provide for a novel and improved releasable securing device for a pet leash to a person running or walking so that the leash is free to rotate without becoming twisted with respect to the securing device and affords increased stability as well as to reduce jarring and entangling or twisting of the leash.

In accordance with the present invention, a pet leash apparatus has been devised for releasably connecting a leash to a person's waist by means of a suspension ring disposed in outer spaced surrounding relation to the waist and including suspension means for releasably attaching the ring so as to be flexibly suspended from the person's waist, and securing means for connecting the leash to the suspension ring. Preferably, the suspension ring is so designed and constructed that the leash is free to slide around the ring as well as being rotatable about an axis passing along the length of the leash.

Other objects, advantages and features of the present invention will become more readily appreciated and understood when taken together with the following detailed description of a preferred embodiment in conjunction with the accompanying drawings, in which:

BRIEF DESCRIPTION OF THE DRAWINGS

FIG. 1 is a perspective view of a preferred form of leash apparatus in an attached position between a jogger and dog in accordance with the present invention;

FIG. 2 is an enlarged top plan view of the preferred form of leash apparatus shown in FIG. 1;

FIG. 3 is an enlarged front view in elevation of the preferred form of apparatus shown in FIG. 1 and 2;

FIG. 4 is a cross-sectional view taken about lines 4—4 of FIG. 3; and

FIG. 5 is a cross-sectional view taken about lines 5-5 of FIG. 2.

DETAILED DESCRIPTION OF PREFERRED EMBODIMENT

Referring in more detail to the drawings, a preferred form of leash apparatus 10 is broadly comprised of a belt 12 sized to encircle the waist of the jogger J, a suspension ring 14 in outer spaced surrounding relation to the belt and suspended from the belt by flexible suspension straps 16, and a leash 18 is connected to a conventional harness or collar C worn by the dog D. The leash 18 may be of conventional construction and is suitably comprised of a cord 20 which is of the retractable type and will automatically return to a coiled state as illustrated in FIG. 3 when relaxed. The leash has a suitable snap hook 21 for releasable attachment to the dog's collar, a hand loop 22 which is releasably attached to another snap hook 23, and a connecting member 24 designed for releasably securing the end of a connector cable 25 extending from the snap hook 23 to the suspension ring 14 in a manner to be described.

The belt 12 may be composed of any suitable fabric or leather material with a standard buckle unit 26 to releasably secure the belt in snug-fitting relation to the waist of the jogger. The ring 14 is preferably of tubular configuration and is oversized with respect to the belt so as to be disposed in outer spaced surrounding relation to the belt and to fit loosely over the jogger's hip region. The ring 14 is flexibly suspended below the jogger's waist by the suspension straps 16, each of the suspension straps include an upper loop portion 30 which receives the belt 12, and a lower loop portion 32 which receives a stiffener member or insert 33. The upper and lower loop portions 30 and 32 are separated by an upper rivet 34 which serves to permanently fasten or unite the layers of material together making up the suspension strap. In this relation, each suspension strap 16 may be suitably composed of a fabric webbing material and which is of a length to cause the suspension ring to loosely encircle the hips of the wearer when the belt is snugly in place around the waist portion. The inserts 33 may suitably be composed of flattened strips of plastic material which will somewhat rigidify the lower loop portion 32 while permitting it to bend freely about the rivet 34. As shown, there are a series of four suspension straps 16 at equal 90° circumferential intervals between the belt 12 and ring 14, and the ring 14 is permanently affixed to the lower edges of the straps 16 by lower rivets 36 extending through and joining the ring to the webbing layers making up each lower loop portion 32.

Preferably, the suspension ring 14 is provided with a latching member 40 and a tube hinge 42 diametrically opposite to the latching member 40 so that the ring can be easily removed along with the belt 12 simply by unlatching the member 40. It should be understood however that the ring 14 may be a continuous ring without a latching member 40 or hinge 42 in which event the ring is placed in position by stepping into and drawing it upwardly and fastening the belt 12 as described; and the reverse procedure is followed in removing the belt 12 and suspension ring 14.

An important feature of the suspension ring is the formation of a continuous circumferential slot 44 around the exterior wall portion of the ring and in communication with the hollow interior of the ring. The slot 44 is so located as to extend along the lower outside half of the ring so as to be in a somewhat downwardly facing or inclined position. The connecting member 24 is characterized by including an eyebolt 46 with a threaded stem portion 47 connected to a spherical or ball-shaped connecting end portion 48, the end portion 48 being sized to advance freely through the hollow interior of the ring 14. It should be noted that the latch member 40 and tube hinge 42 having mating portions which surround the free ends of the ring and which when brought into engagement will automatically align the ends of the ring as well as the slots 44 so that the connecting portion end 24 is free to advance or slide continuously through 360°, for example, if the dog should be circling or running around the jogger. Further, the ball-shaped connector end 48 will prevent the leash from becoming twisted or snarled as it slides with respect to the ring. When the complementary halves of the latching member 40 are joined, a pin 50 which is attached by a ring 51 to a cable 52 is inserted through aligned openings in the mating halves, as best seen from FIG. 2.

In use, the belt 12 is unbuckled and the suspension ring 14 unlatched as described so that both members may be passed around the waist and hip region of the jogger. The buckle 26 is then closed along with the latching member 40 as described with the belt 12 encircling the waist and the ring 14 loosely encircling the hip region. It will be evident that the connecting member 24 is first assembled by placing the end portion 48 into one of the open or free ends of the ring 14 when the latching member is unlatched, as shown in FIG. 3. Accordingly, when the latching member 40 is closed, the end portion 48 will be securely retained within the tubular ring. Initially, the jogger may wish to attach the snap hook 21 to the collar C of the dog D and hold the leash by passing one hand through the hand loop 22. When desired to attach the leash to suspension ring 14, it is merely necessary to insert the hand loop 22 into the end of the snap hook 23 thereby leaving both hands free in jogging or otherwise exercising. In running, the leash will follow the movement of its end portion 48 which is free to slide through the hollow interior of the ring 14 with the stem portion 47 sliding along the slot 44.

Any tendency on the part of the dog to tug against the leash is resisted by the ring, and any sudden jarring or movement on the part of the dog is absorbed to some extent by the ring and its flexible connection to the belt 12. In this relation, it will be apparent that other forms of flexible attachment of the ring to the waist of the runner may be utilized in place of the belt 12. Furthermore, modifications may be made in the particular construction and arrangement of the end connecting member 24, although the ball-shaped connecting portion 48 as described has been found to be especially effective in permitting the leash to advance freely around the ring while avoiding any twisting or snarling of the leash.

The length of the connector cable 25 is such that the jogger can conveniently reach for the hand loop 22 at the end of the leash for more direct control over the dog when necessary, and the connector cable 25 serves as a flexible means of attachment between the hand loop 22 and the end connecting member 24. Furthermore, the snap hook 23 serves as a means of quick release for the leash 18. In this respect, other quick release connectors may be employed in place of the snap hook 23, such as, those of the pushbutton type which are commonly used on seat belt fasteners.

It is therefore to be understood that while a preferred form of the invention has been herein set forth and described, various modifications and changes may be made in the construction and arrangement of parts comprising the preferred form of invention, in addition to those described, without departing from the spirit and scope of the invention as defined by the appended claims and reasonable equivalents thereof.

We claim:

1. A leash retaining apparatus for use by a person in exercising with a pet comprising:
 a belt adapted to encircle a waist;
 a suspension ring disposed in outer spaced surrounding relation to said belt, and suspension means flexibly securing said ring to said belt; and
 a leash extending from said ring including securing means slidably connecting one end of said leash to said ring whereby said leash is free to slide circumferentially with respect to said ring.

2. Apparatus according to claim 1, said suspension means defined by flexible connecting members extending at circumferentially spaced intervals between said leash and said ring.

3. Apparatus according to claim 2, each of said flexible connecting members including an internal stiffener member.

4. Apparatus according to claim 1, said ring provided with a circumferentially extending slot, and said one end of said leash including an enlarged connecting portion inserted into said slot.

5. Apparatus according to claim 1, said belt including a buckle for releasably connecting said belt together so as to be adapted to encircle a person's waist.

6. Apparatus according to claim 1, said ring including connecting ends and a latching member for releasably interconnecting said connecting ends of said ring, and a hinge member disposed on said ring in diametrically opposed relation to said latching member.

7. Apparatus according to claim 1, said securing means being defined by a generally spherical portion at said one end of said leash inserted into a cavity in said ring.

8. Apparatus according to claim 7, said cavity extending circumferentially around said ring, and a wall of said ring being slotted in a circumferential direction whereby said one end of said leash is free to slide circumferentially through 360° with respect to said ring.

9. Apparatus according to claim 8, said slot disposed in a lower one-half of an outside wall of said ring.

10. Apparatus according to claim 7, said ring being of tubular configuration with a circumferentially extending slot disposed in a lower wall portion of said ring.

11. A pet leash apparatus for releasably connecting a leash to a person's waist, the improvement comprising:
    a suspension ring disposed in outer spaced surrounding relation to a person's waist, means for encircling a person's waist, and suspension means for flexibly suspending said ring from said waist-encircling means; and
    securing means for connecting said leash to said suspension ring.

12. In pet leash apparatus according to claim 11, said suspension ring being in the form of a tube, and said leash including said securing means for connecting said leash to said ring whereby said leash is free to slide in a circumferential direction with respect to said ring.

13. In pet leash apparatus according to claim 11, said waist-encircling means including a belt member for releasably attaching said ring to a person's waist.

14. In pet leash apparatus according to claim 11, said ring including connecting ends and a latch member for releasably connecting said connecting ends of said ring together.

15. In pet leash apparatus according to claim 11, said ring being of tubular configuration and having a continuous circumferential slot formed in a wall of said ring, and said securing means defined by a spherical end portion on said leash inserted into said ring and a stem member extending from said spherical end portion through said slot in said ring.

16. In pet leash apparatus according to claim 15, said slot being directed downwardly through said wall of said ring.

17. A leash apparatus for use by a person as an exerciser and leash comprising:
    a belt adapted to encircle a person's waist, said belt including a buckle for releasably connecting free ends of said belt together so as to encircle a person's waist;
    a tubular suspension ring disposed in outer spaced surrounding relation to said belt, and suspension means flexibly securing said ring to said belt, said suspension means defined by flexible connecting members each in the form of upper and lower loop portions at spaced intervals between said belt and said ring, and an internal stiffener member in each said lower loop portion; and
    a leash extending from said ring including securing means slidably connecting one end of said leash to said ring whereby said ring is free to slide circumferentially with respect to said ring.

18. Apparatus according to claim 17, said ring provided with a circumferentially extending slot, and said one end of said leash including an enlarged connecting portion inserted into said ring.

19. Apparatus according to claim 18, including a connector cable member interconnecting said one end of said leash and said connecting portion, and quick release means for releasably connecting said one end of said leash to said connector cable.

20. Apparatus according to claim 17, said ring 14 including connecting ends and a latching member for releasably interconnecting said connecting ends of said ring, and a hinge member disposed on said ring in diametrically opposed relation to said latching member, and said securing means being defined by a generally spherical portion at said one free end of said leash inserted into said ring.

21. Apparatus according to claim 20, a wall of said ring including a slot extending in a circumferential direction whereby said one end of said leash is free to slide circumferentially with respect to said ring, said slot disposed in a lower portion of an outside wall of said ring.

* * * * *